United States Patent
Dharmarajan et al.

(10) Patent No.: US 6,852,424 B2
(45) Date of Patent: Feb. 8, 2005

(54) POLYMER COMPOSITE STRUCTURE

(75) Inventors: Narayanaswami Raja Dharmarajan, Houston, TX (US); Sudhin Datta, Houston, TX (US); Michael C. Bulawa, Houston, TX (US); Srivatsan Srinivas, Pearland, TX (US); Thomas J. Reynolds, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 39 days.

(21) Appl. No.: 10/451,507

(22) PCT Filed: Dec. 11, 2001

(86) PCT No.: PCT/US01/47886

§ 371 (c)(1),
(2), (4) Date: Jun. 20, 2003

(87) PCT Pub. No.: WO02/051928

PCT Pub. Date: Jul. 4, 2002

(65) Prior Publication Data

US 2004/0053067 A1 Mar. 18, 2004

Related U.S. Application Data

(60) Provisional application No. 60/258,096, filed on Dec. 22, 2000, and provisional application No. 60/258,131, filed on Dec. 22, 2000.

(51) Int. Cl.[7] .............................................. B32B 27/32
(52) U.S. Cl. ....................... 428/516; 528/515; 528/523; 528/519; 156/334
(58) Field of Search ................................ 428/523, 515, 428/516, 519; 156/334

(56) References Cited

U.S. PATENT DOCUMENTS

| | | | |
|---|---|---|---|
| 3,801,531 A | | 4/1974 | Berejka et al. ............ 260/33.4 |
| 3,867,247 A | | 2/1975 | O'Farrell et al. ............. 161/88 |
| 4,803,020 A | | 2/1989 | Valaitis et al. ................. 264/22 |
| 4,822,840 A | | 4/1989 | Kioka et al. ................. 525/240 |
| 5,041,338 A | * | 8/1991 | Suehiro et al. ............. 428/516 |
| 5,077,123 A | | 12/1991 | Shigemoto .................. 428/349 |
| 5,260,111 A | | 11/1993 | Valaitis et al. ................ 428/57 |
| 5,532,030 A | * | 7/1996 | Hirose et al. .............. 428/35.7 |
| 5,567,515 A | | 10/1996 | Koga et al. .................. 428/355 |
| 5,611,982 A | * | 3/1997 | Mathavan et al. .......... 264/131 |
| 6,271,311 B1 | * | 8/2001 | Ravishankar et al. ....... 525/191 |
| 6,346,571 B1 | * | 2/2002 | Dharmarajan et al. ........ 525/72 |
| 6,376,610 B1 | * | 4/2002 | Dharmarajan et al. ...... 525/211 |
| 6,495,266 B1 | * | 12/2002 | Migliorini .................... 428/461 |
| 6,565,986 B2 | * | 5/2003 | Itoh ........................... 428/483 |
| 2002/0136916 A1 | * | 9/2002 | Cheung et al. ............. 428/517 |
| 2002/0176974 A1 | * | 11/2002 | Hanyu et al. ................ 428/213 |
| 2004/0053067 A1 | * | 3/2004 | Dharmarajan et al. ...... 428/521 |
| 2004/0059061 A1 | * | 3/2004 | Jourdian et al. ............ 525/191 |

FOREIGN PATENT DOCUMENTS

| | | | |
|---|---|---|---|
| EP | 0 342 244 B1 | 12/1994 | ........... C08L/23/08 |
| EP | 0 733 476 A2 | 9/1996 | ........... B32B/27/32 |
| EP | 0 462 680 B1 | 10/1996 | ........... C08L/23/10 |
| EP | 0 593 859 B1 | 6/1997 | ........... C08L/23/02 |
| EP | 0 716 121 B1 | 3/1999 | ........... C08L/23/10 |
| JP | 6263935 | 9/1934 | ........... C08L/23/10 |
| JP | 58171952 | 10/1983 | ........... B32B/27/32 |
| WO | WO 00/69963 | 11/2000 | ........... C08L/23/16 |
| WO | WO 00/69964 | 11/2000 | ........... C08L/23/16 |

* cited by examiner

*Primary Examiner*—D. Lawrence Tarazano

(57) ABSTRACT

Two-component polymer composite structures are described, such as a composite structure that includes a first polymer structure and a second polymer structure adhered to one another through interfacial adhesion provided by a semicrystalline random copolymer with 70–88 mole % propylene units and alpha olefin units having 2 or from 4 to 10 carbon atoms, the semicrystalline random copolymer having a heat of fusion of from 2 to 90 J/g and a crystallinity of from 2% to 65% of the crystallinity of isotatic polypropylene.

52 Claims, No Drawings

POLYMER COMPOSITE STRUCTURE

This application is the National Stage of International Application No. PCT/US01/47886, filed Dec. 11, 2001, which claims the benefit under 35 U.S.C. §119(e) of U.S. Provisional Application No. 60/258,096, filed Dec. 22, 2000, and U.S. Provisional Application No. 60/258,131, filed Dec. 22, 2000, the entire disclosures of which are hereby incorporated herein by reference.

BACKGROUND

A. Field of Invention

The present invention relates to polymer composite structures. For example, multi-layer films used for heat seaming polymeric sheeting materials or multi-layer films used for heat seaming roof-sheeting materials are described. Also described are composite structures that include molded polymer structures adhered to one another. In a preferred embodiment, a two component polymer composite structure is disclosed, such as a two-layer film structure.

B. Related Art

As discussed below, certain aspects of the invention are directed to multi-layer films. In the past, polymeric roof sheeting materials in the form of single-ply roofing membranes have been used to cover flat rooftops typically found on industrial or commercial buildings, e.g., factories, hospitals, and school buildings. These roof membranes may be applied on roofs in vulcanized form. Owing to the combination of low cost, ease of installation, weather resistance, and good physical properties, ethylene-propylene-diene terpolymer based compounds have been used in single-ply thermoset roof sheeting materials. Those compounds may be vulcanized in large sheets (e.g., 100 ft.×500 ft.) in an autoclave using traditional vulcanizing agents such as sulfur or sulfur donors. The compounds may also be cured using radiation, as discussed in Valaitis et al. (U.S. Pat. No. 4,803,020). When roof sheets are used to cover a large industrial roof, the ends of the sheets are typically spliced together to form a structurally rigid seam. However, after installation, this seam is constantly subjected to adverse weather conditions, such as thermal stresses, high velocity winds, and moisture. One of the problems with using cured elastomeric membranes for roof sheets is the lack of effective adhesion between adjoining sheets.

Efforts to solve this adhesion problem have included the use of contact or pressure sensitive adhesive compounds to provide seams between adjoining sheets. Examples of such compounds include those formulated with neoprene, butyl or butyl type polymers, and tackifying resins. Those compounds, however, provide poor peel strength. Furthermore, they often experience degradation in seam performance at elevated temperatures. Other examples of pressure sensitive adhesive compositions for seaming roofing materials together are adhesives formulated with partially neutralized or unneutralized sulfonate elastomers, tackifying resins, and organic solvents, as discussed in Berejka et al. (U.S. Pat. No. 3,801,531) and O'Farrell et al. (U.S. Pat. No. 3,867,247). Berejka et al. discusses adhesive compounds containing thiouronium derivatives of unsaturated elastomers or neutralized, partially neutralized, or unneutralized sulfonated elastomers including sulfonated EPDM and other ingredients. O'Farrell et al. discusses adhesive contact cements containing partially neutralized or unneutralized butyl elastomers, tackifying resins, and organic solvent mixtures. However, these adhesive compositions suffer from poor adhesive properties and, furthermore, include organic solvents which may run afoul of environmental regulations. Another article used for seaming vulcanized roof sheets involves the use of a "tie layer" material (e.g., tape) that is inserted between the ends of the sheets and seamed in place by applying heat. Valaitis et al. (U.S. Pat. No. 5,260,111) discusses a heat seamable thermoplastic tape for roofing applications. That tape includes a thermoplastics compound, namely high-density polyethylene, ethylene-vinyl acetate, or blends thereof. However, those tapes still provide poor adhesion and poor seam integrity properties. Therefore, a continuing need exists for improved sheeting materials for roofing applications and for other uses.

For additional background, see also WO 00/69963A, WO 00/69964A, JP 06 263935A, EP 462,680, EP 733,476, EP 716,121, EP 672,737, and EP 593,859.

SUMMARY OF INVENTION

This invention relates broadly to a composite structure, preferably, a composite structure in which a first polymer structure is adhered to and in surface contact with a second polymer structure by an adhesive interface between the first polymer structure and the second polymer structure, wherein interfacial adhesion is provided by a semicrystalline random copolymer in the first polymer structure, in the second polymer structure, or in a third adhesive structure. The semicrystalline random copolymer can also be made part of both the first polymer structure and/or the second polymer structure. Preferably, one or both of those polymer structures is a blend that incorporates an adhesive composition comprising a semicrystalline random copolymer, wherein the two polymer structures are adhered to one another primarily through the presence of the semicrystalline random copolymer. The adhesive composition should have an effective amount of the semicrystalline random copolymer, so that when the composite structure is formed, e.g., by pressing the two polymer structures against one another at a selected pressure and adhesion temperature, the resulting polymer structure will have the desired overall adhesion strength. As discussed in greater detail below, any of the polymer structures containing the semicrystalline random copolymer preferably has a sufficient amount of another polymer or polymer blend to provide that polymer structure with the desired structural properties, e.g., tensile strength. Thus, the adhesive properties that should be provided by virtue of the presence of the semicrystalline random copolymer are preferably balanced with the other properties supplied by the other polymer(s) with which the semicrystalline random copolymer can be blended or otherwise used.

Another specific embodiment of the invention includes a composite structure that includes (a) a first solid polymer component; (b) a second solid polymer component which includes from 5 to 30 wt % of an isotactic polymer comprising a semi-crystalline random copolymer with 75 mole % to 95 mole % of propylene derived units in surface contact with the first component and having a melting point of from 25° C. to 105° C., the components being adhered together by melting to form the composite structure.

Another specific embodiment refers to a two-component composite structure, comprising (a) a first polymer structure and (b) a second polymer structure, the first polymer structure being adhered to the second polymer structure by (c) an adhesive interface between the first polymer structure and the second polymer structure wherein interfacial adhesion is provided by a semicrystalline random copolymer in the first polymer structure, the second polymer structure, or in a third adhesive structure, the semicrystalline random copolymer comprising 70–88 mole % propylene units and alpha olefin units having 2 or from 4 to 10 carbon atoms, the semicrystalline random copolymer having a heat of fusion of from 2 to 90 J/g and a crystallinity of from 2% to 65% of the crystallinity of isotatic polypropylene.

Still another specific embodiment includes a composite structure comprising: (a) a first solid polymer component; (b) a second solid polymer component which includes from 5 to 30 wt % of an isotactic polymer comprising a semicrystalline random copolymer with 75 mole % to 95 mole % of propylene derived units in surface contact with the first component and having a melting point of from 25° C. to 105° C., the components being adhered together by melting to form the composite structure. Alternatively, the components can be being adhered together by pressure at an elevated temperature sufficient to provide bonding between the first and second solid polymer components.

DETAILED DESCRIPTION OF INVENTION

Various specific embodiments, versions and examples of the invention will now be described, including preferred embodiments and definitions that are adopted herein for purposes of understanding the claimed invention. It is understood, however, that the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

Definitions and Properties

Certain terms and properties used in characterizing aspects of this invention will now be defined, as used in this patent and for purposes of interpreting the scope of the claims.

Semicrystalline Random Copolymer. The adhesive interface in each of the composite structures described herein preferably includes a "semicrystalline random copolymer." The term "random copolymer" as used herein is defined as a copolymer in which the distribution of the monomer residues is consistent with the random statistical polymerization of the monomers, and includes copolymers made from monomers in a single reactor, but does not include copolymers made from monomers in series reactors, which are defined herein to be "block copolymers." The random copolymer discussed herein is preferably "semicrystalline," meaning that in general it has a relatively low crystallinity, as will be discussed more specifically below. This semicrystalline random copolymer preferably includes 70–88 mole % propylene units and alpha olefin units having 2 carbon atoms (ethylene units) or from 4 to 10 carbon atoms, e.g., butene units or octene units. Thus, in a specific embodiment, a preferred semicrystalline random copolymer is a polypropylene polymer, specifically a propylene-ethylene copolymer, in which a substantial number of the copolymer units, e.g., 70–88 mole % of them, are propylene units. That semicrystalline random copolymer is thus distinguishable from copolymers made of propylene and ethylene units that have fewer than 70 mole % propylene units, including conventional polyethylene polymers having some amount of propylene. It has been discovered that superior adhesive properties can be obtained using one or more of the semicrystalline random copolymers described herein.

Adhesive Interface. In certain embodiments, the composite structure includes an adhesive interface. As used herein, the term "adhesive interface" refers broadly to any material that provides adhesion between one polymer structure and another polymer structure, e.g., two films or molded components that are pressed together at an elevated adhesion temperature to form a composite structure. In the case of a composite structure that includes two polymer structures, e.g., two molded items or extruded sheets, the adhesive interface can be a portion of at least one of the polymer structures that contacts the other polymer structure, thus providing for adhesion between those two polymer structures. In the case of a composite structure that includes three polymer structures, the adhesive interface can be part of a third polymer structure (e.g., a film or tape) that is sandwiched between a first polymer structure and a second polymer structure. In that case, one side of the third polymer structure (film) adheres to the first polymer structure, while the other side of the third polymer structure (film) adheres to the second polymer structures, thus adhering or bonding one to the other via the third polymer structure. Advantageously, with this three-layer composite structure, the first and second sheets need not contain any semicrystalline random copolymer, and the third sheet provides the adhesive interface. It is understood, of course, that a certain amount of adhesion may be provided by a polymer structure even though that structure does not include any semicrystalline random copolymer. It is also understood that additional adhesives may be added to provide even more adhesion strength. However, one of the advantages provided by this invention is that no additional adhesives are required, making easier the forming of composite structures from two separate polymer structures.

Polymer Structures. The term "polymer structure" is defined herein to include any substantially flat structure that may be adhered to one another, such as films, which include sheets, layers and the like, and in some cases the structure may be partially melted, e.g., during adhesion. The term "polymer structure" also includes any "non-flat" structure, such as a molded part that is used in automobiles, discussed above, in which case the structure may have a curved or rounded surface. However, the term "polymer structure" is defined as not including any particulate matter, such as pellets.

Heat of Fusion. One property that can be used to characterize the semicrystalline random copolymer is its heat of fusion. In a preferred embodiment, the semicrystalline random copolymer has a heat of fusion of from 2 to 90 J/g. As used herein, the "heat of fusion" is measured using Differential Scanning Calorimetry (DSC), which can be measured using the ASTM E-794-95 procedure. Preferably, about 6 mg to about 10 mg of a sheet of the polymer pressed at approximately 200° C. to 230° C. is removed with a punch die and is annealed at room temperature for 48 hours. At the end of this period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak of the sample which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting temperature of the sample.

Crystallinity. Another property that can be used to characterize the semicrystalline random copolymer is its crystallinity, which as discussed above is relatively low. As discussed below, the semicrystalline random copolymer used in specific embodiments of this invention preferably has a crystallinity of from 2% to 65% of the crystallinity of isotatic polypropylene. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semicrystalline random copolymer having a heat of fusion of 95 J/g will have a crystallinity of 50%. The term "crystallizable" as used herein refers to those polymers or sequences that are mainly amorphous in the undeformed state, but upon stretching or annealing, become crystalline. Thus, in certain specific embodiments, the semicrystalline random copolymer can be crystallizable.

Melting Points. Preferably, when referring to a composite structure, the melting point of the first polymer structure and the melting point of the second polymer structure are both higher than the melting point of the semicrystalline random copolymer. The term "melting point" for a material as used herein is defined as the highest peak among principal and secondary melting peaks as determined by Differential Scanning Calorimetry (DSC), discussed above.

Debonding Temperatures. Preferably, the debonding temperature of the composite structure is higher than the bonding temperature of the composite structure. A composite structure of this invention may be formed by adhering (bonding) a first polymer structure to the second polymer structure. The temperature that is selected for bonding these two polymer structures can vary. Typically, a higher bonding temperature provides greater adhesion strength. In the case of certain composite structures that utilize conventional adhesives, satisfactory adhesion strength can be achieved at selected bonding temperatures during the formation or manufacture of the composite structures, e.g., multifilm structures or composite structures that include two different molded parts bonded to one another. However, those same composite structures often "debond," e.g., delaminate, when they are subjected to a temperature that is the same as or in some cases even lower than the bonding temperature. Accordingly, to avoid such debonding or to minimize the possibility that such debonding might occur, either a higher bonding (adhesion) temperature is often used or the environment of the composite structure is maintained to avoid debonding.

Composition. Certain specific embodiments include a copolymer with a specified ethylene "composition." The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$ to 400 $cm^{-1}$ is recorded and the monomer weight percent of ethylene can be calculated according to the following equation: Ethylene wt %=82.585−111.987X+30.045 $X^2$, wherein X is the ratio of the peak height at 1155 $cm^{-1}$ and peak height at either 722 $cm^{-1}$ or 732 $cm^{-1}$, whichever is higher. The concentrations of other monomers in the polymer can also be measured using this method.

Composition distribution. The "composition distribution" of copolymers can be measured according to the following procedure. About 30 g of the copolymer is cut into small cubes about ⅛ inch per side. These cubes are introduced into a thick walled glass bottle closed with screw cap along with 50 mg of Irganox 1076, an antioxidant commercially available from Ciba-Geigy Corporation. Then, 425 ml of hexane (a principle mixture of normal and iso isomers) is added to the contents of the bottle and the sealed bottle is maintained at about 23° C. for about 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the copolymer component soluble at 40° C., 48° C., 55° C., and 62° C. are obtained at temperature increases of approximately 8° C. between stages. Further, increases in temperature to 95° C. can be accommodated, if heptane, instead of hexane, is used as the solvent for all temperatures about 60° C. The soluble polymers are dried, weighed and analyzed for composition, as for example by weight percent ethylene content, by an infrared spectrophotometer techniques described below. Soluble fractions obtained in the adjacent temperature increases are the adjacent fractions in the specification above. A polymer is said to have a "narrow compositional distribution" herein when at least 75 weight percent of the polymer is isolated in two adjacent soluble fractions, each fraction having a composition difference of no greater than 20% of the average weight percent monomer content of the average first polymer component.

Tacticity. Tacticity is a feature of certain specific embodiments of this invention. The term "tacticity" as used herein generally refers to the stereogenicity in a polymer. For example, the chirality of adjacent monomers can be of either like or opposite configuration. The term "diad" is used to designate two contiguous monomers; three adjacent monomers are called a triad. If the chirality of adjacent monomers is of the same relative configuration, the diad is called isotatic; if opposite in configuration, it is termed syndiotactic. Another way to describe the configurational relationship is to term contiguous pairs of monomers having the same chirality as meso (m) and those of opposite configuration racemic (r). When three adjacent monomers are of the same configuration, the stereoregularity of the triad is 'mm'. If two adjacent monomers in a three-monomer sequence have the same chirality and that is different from the relative configuration of the third unit, this triad has 'mr' tacticity. An 'rr' triad has the middle monomer unit having an opposite configuration from either neighbor. The fraction of each type of triad in the polymer can be determined and when multiplied by 100 indicates the percentage of that type found in the polymer. The triad tacticity can be determined from a $^{13}$C-NMR spectrum of the propylene copolymer. The $^{13}$C-NMR spectrum is measured in the following manner. To measure the $^{13}$C-NMR spectrum, 250–350 mg of polymer is completely dissolved in deuterated tetrachloroethane in a NMR sample tube (diameter: 10 mm) at 120° C. The measurement is conducted with full proton decoupling using a 90° pulse angle and at least a 15 second delay between pulses. With respect to measuring the chemical shifts of the resonances, the methyl group of the third unit in a sequence of 5 contiguous propylene units consisting of head-to-tail bonds and having the same relative chirality is set to 21.83 ppm. The chemical shift of other carbon resonances are determined by using the above-mentioned value as a reference. The spectrum relating to the methyl carbon region (17.0–23 ppm) can be classified into the first region (21.1–21.9 ppm), the second region (20.4–21.0 ppm), the third region (19.5–20.4 ppm) and the fourth region (17.0–17.5 ppm). Each peak in the spectrum was assigned with reference to literature source such as the articles in, "Polymer", 30 (1989) 1350 or "Macromolecules", 17 (1984) 1950 which are fully incorporated by reference. In the first region, the signal of the center methyl group in a PPP (mm) triad is located, and in the second region, the signal of the center methyl group in a PPP (mr) triad and the methyl group of a propylene unit whose adjacent units are a propylene unit and an ethylene unit resonates (PPE-methyl group). In the third region, the signal of the center methyl group in a PPP (rr) triad and the methyl group of a propylene unit whose adjacent units are ethylene units resonate (EPE-methyl group).

The triad tacticity (mm fraction) of the propylene copolymer can be determined from a $^{13}$C-NMR spectrum of the propylene copolymer and the following formula:

$$mm \text{ Fraction} = \frac{PPP(mm)}{PPP(mm) + PPP(mr) + PPP(rr)}$$

The peak areas used in the above calculation are not measured directly from the triad regions in the $^{13}$C-NMR spectrum. The intensities of the mr and rr triad regions need to have subtracted from them the areas due to EPP and EPE sequencing, respectively. The EPP area can be determined from the signal at 30.8 ppm after subtracting from it one half the area of the sum of the signals between 26 and 27.2 ppm and the signal at 30.1 ppm. The area due to EPE can be determined from the signal at 33.2 ppm. In addition to the above adjustments to the mr and rr regions for the presence of EPP and EPE, other adjustments need to be made to these regions prior to using the above formula. These adjustments are needed to account for signals present due to non-head-to-tail propylene additions. The area of the mr region may be adjusted by subtracting one half of the area between 34 and 36 ppm and the area of the rr region may be adjusted by subtracting the intensity found between 33.7 and 40.0 ppm. Therefore, by making the above adjustments to the mr and rr regions the signal intensities of the mm, mr and rr triads can be determined and the above formula applied.

Isotactic and Syndiotactic. The term "isotatic" as used herein is defined as referring to a polymer sequence in which greater than 50% of adjacent monomers having groups of atoms that are not part of the backbone structure are located either all above or all below the atoms in the backbone chain, when the latter are all in one plane. The term "syndiotactic" as used herein is defined as referring to a polymer sequence in which greater than 50% of adjacent monomers which have groups of atoms that are not part of the backbone structure are located in some symmetrical fashion above and below the atoms in the backbone chain, when the latter are all in one plane. Certain polymers in blends or polymer sequences within a single polymer are described as having "substantially the same tacticity," which herein means that the two polymers or polymer sequences being compared are both either isotatic or syndiotactic.

Molecular weight and Molecular Weight Distribution. The "molecular weight" ($M_n$ and $M_w$) and "molecular weight distribution" (MWD) as used herein can be determined by a variety of methods, including those in U.S. Pat. No. 4,540,753 (Cozewith et al.), the methods of which are incorporated by reference herein for purposes of U.S. practices and references cited therein, or those methods found in Verstrate et al, Macromolecules, v. 21, p. 3360 (1988), the descriptions of which are incorporated by reference for purposes of U.S. practice and references cited therein. To the extent a specific test procedure is required, that method will be identified herein.

Mooney Viscosity. The "Mooney viscosity" as used herein was measured as ML/1+4 at 125° C. in Mooney united according to ASTM D1646, unless otherwise specified.

Thermoplastic. The term "thermoplastic" as used herein is defined as referring to a plastic that can be repeatedly softened by heating and hardened by cooling.

Thermoset. The term "thermoset" or "thermosetting plastic" as used herein is defined as referring to a plastic that hardens permanently after being heated once.

Crosslinked. The term "crosslinked" as used herein refers to any material that has been subjected to a procedure that causes crosslinking in the polymer chain, e.g., to create branching. A material can be crosslinked by curing or vulcanizing. Thus, for example, a crosslinked elastomeric material may include a vulcanized EPDM.

Specific Embodiments of Composite Structures

As discussed above, one aspect of this invention includes a composite structure that includes (a) a first polymer structure and (b) a second polymer structure, wherein the first polymer structure is adhered to the second polymer structure by an adhesive interface which includes (c) a semicrystalline random copolymer having 70–88 mole % propylene units and alpha olefin units having 2 or from 4 to 10 carbon atoms, the semicrystalline random copolymer having a heat of fusion of from 2 to 90 J/g and a crystallinity of from 2% to 65% of the crystallinity of isotatic polypropylene.

Preferably, the melting point of the first polymer structure and the melting point of the second polymer structure are both higher than the melting point of the semicrystalline random copolymer. Also, the debonding temperature of the composite structure is preferably higher than the bonding temperature of the composite structure. The debonding temperature of the composite structure can be higher than the melting point of the first thermoplastic polymer, or higher than the melting point of the second thermoplastic polymer.

In a specific embodiment, the semicrystalline random copolymer has a melting point of from 25° C. to 105° C. The semicrystalline random copolymer is preferably obtainable by polymerizing monomers in the presence of a metallocene catalyst in a single reactor.

The semicrystalline random copolymer preferably has a crystallinity of from 2 to 45 J/g. The semicrystalline random copolymer more preferably has a crystallinity of from 2 to 30 J/g, and even more preferably a crystallinity of from 2 to 15 J/g.

Certain properties of specific embodiments of the invention include peel strength and initial tensile strength, reflecting desired characteristics of composite structures, particularly multifilm structures. As discussed elsewhere herein, the superior peel strength coupled with superior tensile strength represents a significant and unexpected improvement when compared to non-invention composite structures. The composite structure preferably has a peel strength of at least 10 KN/m, e.g., above 13.8 KN/m and an initial tensile strength at a temperature of 21° C. of at least 9 Mpa, e.g., above 9.7 Mpa.

Another property that can be used to characterize specific embodiments of composite structures is die tear strength, which is preferably at least 30 KN/m, e.g., above 34 KN/m measured at a temperature of 21° C. Also, another property that can be used to characterize the composite structure is trouser tear strength, which is preferably at least 25 KN/m, e.g., above 27 KN/m measured at a temperature of 21° C. Yet another property that can characterize the composite structure is initial hardness. As referred to herein, the initial hardness of the composite structure is at least 72 Shore A at a temperature of 21° C. Also, the composite structure can be described in terms of initial elongation, which should be at least 738% at a temperature of 21° C.

Tacticity is a feature of certain specific embodiments of the invention. For example, the semicrystalline random copolymer preferably has an MM fraction triad tacticity of from 80% to 100%. The semi-crystalline random copolymer can alternatively have an MM fraction triad tacticity of from 80% to 100% and the first or second polymer structures can include a crystalline isotatic polymer also having an MM fraction triad tacticity of from 80% to 100%. The semicrystalline random copolymer in the polymeric adhesive component more preferably has an MM fraction triad tacticity of from 90% to 99%. Yet more preferably, the semicrystalline random copolymer in the polymeric adhesive component has an MM fraction triad tacticity of from 90% to 99%, and the first or second polymer structures more preferably also includes a crystalline isotatic polymer that also has an MM fraction triad tacticity of from 90% to 99%.

The adhesive interface of the composite structure can include a multiphase blend composition having a continuous phase that includes a continuous phase polymer and a dispersed phase that includes a dispersed phase polymer, the dispersed phase polymer having a melting point higher than the melting point of the continuous phase polymer, and a heat of fusion higher than the heat of fusion of the continuous phase polymer.

A number of different polymeric materials can be used for the polymer structures used to form the composite structures. For example, elastomeric materials and thermoplastic polymers can be used. For example, a composite structure can be provided in which the first structure and the second structure each includes a crosslinked elastomeric material. A composite structure can be provided in which: (a) the first polymer structure has a continuous phase of a crosslinked elastomeric material; and (b) the second polymer structure has a continuous phase of a thermoplastic polymer. Further, a composite structure can be provided in which the first polymer structure has a continuous phase of a first thermoplastic polymer and the second polymer structure has a continuous phase of a second thermoplastic polymer. In certain specific embodiments of a composite structure, the first polymer structure can include a blend of the crosslinked elastomeric material and the semicrystalline random copolymer. The second polymer structure can include a blend of the thermoplastic polymer and the semicrystalline random copolymer.

As discussed above, a specific embodiment of this invention includes a composite structure that includes (a) a first polymer structure having a continuous phase that includes a crosslinked thermoplastic material or a thermoplastic polymer and (b) a second polymer structure having a continuous phase that includes a crosslinked thermoplastic material or a thermoplastic polymer, the second polymer structure being adhered to the first polymer structure by an adhesive interface comprising (c) a polymer blend that includes: (i) from 5 wt % to 98 wt % of a semi-crystalline random copolymer comprising 70–88 mole % or more propylene units and alpha olefin units having 2 or from 4 to 10 carbon atoms, the semi-crystalline random copolymer having a heat of fusion of 2–90 J/g, a melting point of from 25° C. to 105° C. and a crystallinity of from 2% to 65% of the crystallinity of isotatic polypropylene, and (ii) from 2 wt % to 95 wt % of isotatic polypropylene having a melting point of 110° C. or greater.

Also, a composite structure can include (a) a first polymer structure having a continuous phase that includes a crosslinked thermoplastic material or a thermoplastic polymer, (b) a second polymer structure having a continuous phase that includes a crosslinked thermoplastic material or a thermoplastic structure, and (c) an adhesive film layer interposed between the first polymer structure and the second polymer structure to form an interface between the first polymer structure and the second polymer structure and to adhere the first polymer structure to the second polymer structure, the adhesive film layer including a polymer blend that includes: (i) from 5 wt % to 98 wt % of a semicrystalline random copolymer comprising 70–88 mole % or more propylene units and alpha olefin units having 2 or from 4 to 10 carbon atoms, the semi-crystalline random copolymer having a heat of fusion of 2–90 J/g, a melting point of from 25° C. to 105° C. and a crystallinity of from 2% to 65% of the crystallinity of isotatic polypropylene, and (ii) from 2 wt % to 95 wt % of isotatic polypropylene having a melting point of 110° C. or greater.

The composite structure can include an adhesive film layer including the semi-crystalline random copolymer, the adhesive film layer being interposed between the first polymer structure and the second polymer structure to adhere the first polymer structure to the second polymer structure. For example, the composite structure can include a first polymer structure includes a first film and the second polymer structure includes a second film. In specific examples, the composite structure can include (a) a laminate seam that comprises the semicrystalline random copolymer, (b) a tape that comprises the semicrystalline random copolymer, or (c) sheeting that comprises the semicrystalline random copolymer. The cross-linked elastomeric material can include EPDM.

The adhesive interface can include a blend that contains from 5 wt % to 98 wt % of the semicrystalline random copolymer and from 5 wt % to 98 wt % of isotatic polypropylene having a melting point greater than 110° C.

The composite structure can have a continuous phase polymer with a melting point less than 105° C. and a heat of fusion less than 45 J/g and wherein the dispersed phase polymer has a melting point greater than 110° C. and a heat of fusion greater than 60 J/g.

The continuous phase polymer and the dispersed phase polymer can be both isotatic or both syndiotactic.

The first polymer structure or the second polymer structure composite structure can be substantially rigid. The first thermoplastic polymer or the second thermoplastic polymer can include an isotatic crystalline polymer. The first thermoplastic polymer or the second thermoplastic polymer can include isotatic polypropylene. The first polymer structure or the second polymer structure can include blends that include thermoplastic polymers.

Multi-Phase Blend Composition

Another specific embodiment of this invention includes a multiple-layer composite film structure, including a multi-phase blend composition, wherein the blend composition includes a continuous phase including a "first polymer component" (defined below) and a dispersed phase including a "second polymer component" (defined below) wherein the first polymer component has a melting point less than the melting point of the second polymer component and wherein the first and second polymer components each includes polypropylene segments with substantially the same tacticity.

In one embodiment, the structure includes a first polymer layer and a second polymer layer, the first and second layers being in substantially coplanar contact with one another, wherein the first layer or the second layer or both includes the blend composition. Alternatively, the structure includes a first polymer layer, a second polymer layer, and a third polymer layer; the first and second layers being in substantially coplanar contact with one another; the second and third layers being in substantially coplanar contact with one another; and any one or all of the polymer layer includes the blend composition.

In a specific embodiment, the first and second polymer components each includes isotatic polypropylene segments. Preferably, greater than 50% of adjacent propylene segments are isotatic. In another specific embodiment, the first and second polymer components each comprises syndiotactic polypropylene segments. Preferably, greater than 50% of adjacent propylene segments are syndiotactic.

In one embodiment, the first and second layers of the film structure both include the blend composition. In another embodiment, the second layer includes the blend composition and the first layer does not include the blend composition.

In a specific embodiment, the first, second, and third layers of the film structure each comprises either an ethylene-propylene terpolymer, an ethylene-propylene copolymer, or a polypropylene homopolymer.

In one embodiment, the first polymer component of the blend composition comprises a copolymer of propylene and ethylene or at least one other alpha-olefin having 20 carbon atoms or less. In another embodiment, the propylene segment of the first polymer component and the second polymer component of the film structure are isotatic. In yet another embodiment, the first polymer component is comprised of about 5% to about 40%, and preferably 8% to about 18% by weight of ethylene or the other alpha-olefin.

In one embodiment, the second polymer component comprises a propylene homopolymer. In another embodiment, the second polymer component comprises a copolymer of propylene and ethylene or an alpha-olefin have 12 carbon atoms or less. Preferably, the copolymer comprises 9 weight % or less, preferably about 2% to about 8% by weight, most preferably about 2% to about 6% by weight, of ethylene or an alpha-olefin.

In one embodiment, the melting point of the first polymer component is less than about 105° C. and the melting point of the second polymer component is more than about 110° C. Preferably, the melting point of the first polymer component is less than about 100° C. and wherein the melting point of the second polymer component is more than about 115° C. More preferably, the melting point of the second polymer component is more than about 130 degrees.

In another specific embodiment, the first polymer component and the second polymer component each has a weight average molecular weight of at least about 10,000 or greater to about 5,000,000 or less with a polydispersity index of about 1.5 or greater and about 40 or less. Preferably, the first polymer component and the second polymer component each has a weight average molecular weight of at least about 80,000 or greater to about 5,000,000 or less with a polydispersity index between about 1.8 and about 5.

In one embodiment, the first polymer component has a Mooney viscosity of less than about 100, preferably less than about 75, and most preferably less than about 60.

In a specific embodiment, the second polymer layer is disposed between the first and second polymer layers, and wherein the second polymer layer comprises the blend composition in an amount sufficient to adhere the second polymer layer to the first and third polymer layers.

The blend composition may have many different properties. In a specific embodiment, a blend composition layer has a peel strength of at least 13.8 KN/m at room temperature. In another embodiment, the blend composition layer has an initial tensile strength of at least 9.7 MPa at a temperature of 21° C. In yet another embodiment, the blend composition layer has an initial hardness of at least 72 Shore A at a temperature of 21° C. In one embodiment, the blend composition layer has an initial elongation of at least 738% at a temperature of 21° C. In another embodiment, the blend composition layer has a die tear strength of at least 34 KN/m at a temperature of 21° C. In yet another embodiment, the blend composition has a trouser tear strength of at least 27 KN/m at a temperature of 21° C.

In a specific embodiment, the multiple-layer composite film structure comprises a multi-phase blend composition, wherein the blend composition comprises a continuous phase comprising a first polymer component and a dispersed phase comprising a second polymer component, wherein the first polymer component has a heat of fusion less than the heat of fusion of the second polymer component and wherein the first and second polymer components each comprises polypropylene segments with substantially the same tacticity.

In one embodiment, the heat of fusion of the first polymer component is less than about 45 J/g and wherein the heat of fusion of the second polymer component is more than about 60 J/g. Preferably, the heat of fusion of the first polymer component is less than about 35 J/g and wherein the heat of fusion of the second polymer component is more than about 80 J/g. Most preferably, the heat of fusion of the first polymer component is less than about 25 J/g.

In another embodiment, the multiple layer film composite structure comprises a first polymer layer and a third polymer layer, wherein the first and third layers are adhered to one another through a second polymer layer, wherein the first and third layers are the same or different and are selected from: (a) a cured rubber composition; and (b) a propylene-based crystalline polymer; and the second layer includes (c) a blend composition comprising from about 2% to about 95% by weight of a first polymer comprising isotatic polypropylene and having a melting point greater than 110° C., and from about 5% to about 98% by weight of a second polymer component comprising a random copolymer produced by copolymerizing propylene and at least one of ethylene or an alpha-olefin having less than 6 carbon atoms using a chiral metallocene catalyst system, the copolymer having crystallinity from about 2% to about 65% from isotatic polypropylene sequences, a propylene content of from about 75% to 90% by weight, and a melting point of from 25° C. to 105° C.

In another embodiment, the multiple layer composite film structure comprises a first polymer layer and a second polymer layer, wherein at least one of the layers is a blend composition comprising from about 2% to about 95% by weight of a first polymer component comprising isotatic polypropylene and having a melting point greater than about 110° C., and from about 5% to about 98% by weight of the second polymer component comprising a random copolymer produced by copolymerizing propylene and at least one of ethylene or an alpha-olefin having less than 6 carbon atoms using a chiral metallocene catalyst system, said copolymer having crystallinity from about 2% to about 65% from isotatic polypropylene sequences, a propylene content of from about 75% to 90% by weight, and a melting point of from 25° C. to 105° C.

In yet another embodiment, the composite structure comprises the first and second layer are adhered to one another through a third polymer layer. Preferably, one of the layers is a cured rubber composition, a propylene-based polymer. The first and second layers may be the same or different blend compositions.

In a specific embodiment, the multiple-layer composite film structure comprises a multi-layered film, wherein at least one of the layers includes a blend composition comprising from about 2% to about 95% by weight of a first polymer component comprising isotatic polypropylene and having a melting point greater than about 110° C., and from about 5% to about 98% by weight of the second polymer component comprising a random copolymer produced by copolymerizing propylene and at least one of ethylene or an alpha-olefin having less than 6 carbon atoms using a chiral metallocene catalyst system, said copolymer having crystallinity from about 2% to about 65% from isotatic polypropylene sequences, a propylene content of from about 75% to 90% by weight, and a melting point of from 25° C. to 105° C.

In another embodiment, the multi-layer composite structure includes a laminate seam that comprises the blend composition. The structure may include a tape that comprises the blend composition. Alternatively, the structure includes sheeting that comprises the blend composition.

The multiple-layer structure, wherein the structure includes at least two layers of a polymeric sheet, wherein an edge of each polymeric sheet overlaps with an edge of another polymeric sheet to form a seam, the polymeric sheet comprising the blend composition and wherein the seam is formed by application of heat and light pressure at the edges.

In another embodiment, the multiple-layer structure includes two layers of polymeric sheeting with overlapping edges and an adhesive tape for adhering together the overlapped edges of the two layers of polymeric sheeting, in which the adhesive includes the blend composition.

Polymer Blend Compositions

Preferably, the blend composition includes a continuous phase that includes a first polymer component and, optionally, a third polymer component and a dispersed phase that includes a second polymer component. Note that minor amounts of the second polymer component may also be present in the continuous phase. Preferably, the dispersed phase is composed of individual domains less than 5 μm in diameter. This individual domains of the dispersed phase are preferably maintained during processing even without cross-linking.

The present multi-phase blend composition is distinguishable from commonly available reactor products which frequently consist of a single phase blend of isotactic polypropylene and copolymers of propylene and ethylene. Those polymer have only a single phase with no prominent dispersed or continuous phases. The present multi-phase blend composition is also distinguishable from impact copolymers, thermoplastic olefins, and thermoplastic elastomers produced by chiral metallocene catalysts which when combined with a second polymer have heterophase morphology. Typically, in those materials, the more crystalline polymer is part of the continuous phase and not the dispersed phase. The present multi-phase blend compositions are also distinguishable from other multi-phase blend compositions in that a pre-formed or in situ formed compatibilizer does not need to be added to attain and retain the morphology between the low crystalline continuous phase and the high crystalline dispersed phase.

In other embodiments, an important aspect is that the first polymer component has a lower crystallinity than the second polymer component. If included, the third polymer component may have a crystallinity intermediate between the crystallinity of the first and the second polymer component. The degree of crystallinity can be determined based on the melting points or the heat of fusion of the polymer components. Preferably, the first polymer component has a lower melting point than the second polymer component, and the third polymer component, if used, preferably has a melting point between those of the first and the second polymer components. Preferably, the first polymer component also has a lower heat of fusion than that of the second polymer component, and the third polymer component, if used, preferably has a heat of fusion intermediate of the first and the second polymer components.

In certain embodiments, another important aspect relates to the relative tacticities of the polymer components in the blend composition. In one embodiment, the blend composition comprises a blend of the first polymer component and the second polymer component, both components having segments of substantially the same tacticity. In another embodiment, the polymer blend composition comprises a blend of a first, second, and third polymer component, each component having substantially the same tacticity. For example, if the second polymer component contains polypropylene sequences which are substantially isotactic, then the first polymer component and the third polymer component, if used, also contain polypropylene sequences which are substantially isotactic. If the second polymer component contains polypropylene sequences which are substantially syndiotactic, then the first polymer component and the third polymer component, if used, should also contain polypropylene sequences which are substantially syndiotactic.

While not wishing to be bound by theory, it is contemplated that a co-crystallization phenomenon occurs between propylene sequences of similar stereoregularity in the various polymeric components resulting in a merging of the crystallization temperature of the latent components. Accordingly, the combined first polymer component and second polymer component have a blend melting point closer together than would be expected for the individual components alone. However, the intimate blending of the polymer components surprisingly results in a crystallization phenomenon that modifies other physical properties, which increases its commercial utility and range of applications.

Specific embodiments of the polymer blend compositions may include the second polymer component in an amount ranging from 2%–95% by weight. However, the upper limit is preferably 70 weight %, more preferably 40 weight %, even more preferably 30 weight %, and most preferably 25 weight %. The balance of the composition comprises the first polymer component in addition to the third polymer component and process oil. In general, the blend compositions comprises from 5%–100% by weight of the first polymer component and preferably 75%–98% by weight of the first polymer component. In blends containing the third polymer component, the amount of the third polymer component is included in first polymer component fraction for the ratios of the relative amounts of the first polymer component and the second polymer component.

In certain specific embodiments, the blends exhibit a remarkable combination of desirable physical properties. The second polymer component is considered to be critical to many of the improved properties discussed herein. For example, the incorporation of as little as 5% by weight of second polymer component with the first polymer component, increases the melting point of the blend. In addition, the incorporation of the second polymer component may in some case cases reduce or even eliminate the "stickiness" typically found using a propylene/alpha-olefin crystallizable copolymer alone. In addition, certain blends have the advantageous processing characteristics and a resistance to changes in properties due to increased temperature. At the same time, these blends provide a composition having increased softness with improved tensile strength and elongation. Further, these blends have improved resistance to deformation due to tensile deformation compared to either the first polymer component or the second polymer component alone. Furthermore, the addition of the third polymer component leads to a finer morphology of dispersion of the first polymer component and the second polymer component and improvements in some of the properties of the blend composition.

While the above discussion has been generally limited to the description a blend to having only two components (e.g. the first polymer component and the second polymer component and optionally a third polymer component), it will be evident to those skilled in the art that the polymer blend compositions of the present invention may comprise other additives. For example, various additives may be included to enhance a specific property or they may be present as a result of processing of the individual components. Additives which may be incorporated include, for example, process oil, flow improvers, fire retardants, antioxidants, plasticizers, pigments, vulcanizing or curative agents, vulcanizing or curative accelerators, cure retardants, processing aids, flame retardants, tackifying resins, and the like. These compounds may include fillers and/or reinforcing materials. These include carbon black, clay, talc, calcium carbonate, mica, silica, silicate, combinations thereof, and the like. Other additives, which may be employed to enhance properties, include antiblocking agents, and a coloring agent. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives, which may be employed with the present invention.

The blending of the polymer component along with other non-polymeric components may be conducted by any procedure that guarantees an intimate mixture of the components. For example, the components may be combined by melt pressing the components together on a Carver press to a thickness of 0.5 millimeter (20 mils) and a temperature of 180° C., rolling up the resulting slab, folding the ends together, and repeating the pressing, rolling, and folding operation 10 times. Internal mixers are particularly useful for solution or melt blending. Blending at a temperature of 180° C. to 240° C. in a Bartender Plastograph for 1 to 20 minutes has been found satisfactory. Still another method that may be used for mixing the components involves blending the polymers in a Banbury internal mixer above the flux temperature of all of the components, e.g., 180° C. for 5 minutes. A complete mixture of the polymeric components is indicated by the uniformity of the morphology of the distribution of the first polymer component and the second polymer component. Continuous mixing may also be used. These processes are well known in the art and include single and twin screw mixing extruders, static mixers for mixing molten polymer streams of low viscosity, impingement mixers, as well as other machines and processes, designed to disperse the first polymer component and the second polymer component in intimate contact.

Upon reading this disclosure, those skilled in the art will appreciate that other additives may be employed to enhance properties of the composition. As is understood by the skilled in the art, the polymer blend compositions of the present invention may be modified to adjust the characteristics of the blend as desired.

First Polymer Component (FPC)

The "first polymer component" of the polymer blend compositions are defined as polymer components, including blends, that include a copolymer having segments with substantially the same tacticity, e.g., either isotactic or syndiotactic. In an embodiment, the first polymer component comprises a copolymer of propylene and either ethylene and an alpha-olefin having 20 carbon atoms or less, preferably having less than 10 carbon atoms, most preferably being ethylene. For example, a preferred embodiment of the first polymer component comprises a propylene and ethylene copolymer having propylene isotactic segments. In a specific embodiment, the first polymer component includes a copolymer of propylene and either ethylene or an alpha-olefin copolymer, in the amount of from about 5% to about 40% by weight of ethylene or alpha-olefin, preferably from about 8% to about 18% by weight. In another specific embodiment, the first polymer component comprises from greater than about 65% by weight propylene and preferably greater than about 80% by weight propylene.

In another embodiment, the first polymer component further comprises a non-conjugated diene monomer to aid in the vulcanization and other chemical modification of the polymer blend composition. The amount of diene is preferably less than 10 weight %, more preferably less than 5 weight %. The diene may be any non-conjugated diene which are commonly used for the vulcanization of ethylene propylene rubbers, and preferably is ethylidene norbornene, vinyl norbornene, or dicyclopentadiene.

In one embodiment, the first polymer component of the polymer blend comprises a crystallizable copolymer of propylene. The first polymer component is crystallizable because of the stereoregular sequences in the copolymer, such as isotactic propylene sequences for a propylene and ethylene copolymer. The crystallinity of the first polymer component is, preferably, according to one embodiment, from about 2% to about 65%, preferably 5% to 40%, of a homoisotactic polypropylene.

In another embodiment, the first polymer component further comprises a random copolymer having a narrow composition distribution. The first polymer component is described as random because for a first polymer component comprising propylene, ethylene, and optionally a diene, the number and distribution of ethylene residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intramolecular composition distribution of the polymer may be determined by C-13 NMR. For example, NMR can locate first monomer residues in relation to neighboring second monomer residues. Furthermore, an evaluation of the randomness of the distribution of sequences may be obtained by the following consideration. We believe that the first polymer component is random in the distribution of a first and second monomer sequences, such as ethylene and propylene sequences, since (1) it is made with a single sited metallocene catalyst which allows only a single statistical mode of addition of the first and second monomer sequences and (2) it is well mixed in a continuous monomer feed stirred tank polymerization reactor which allows only a single polymerization environment for substantially all of the polymer chains of the first polymer component.

The first polymer component, according to one embodiment, has a single broad melting transition as determined by differential scanning calorimetry (DSC). Typically, a sample of the first polymer component will show secondary melting peaks adjacent to a principal peak. The principal and secondary peaks are considered together as a single melting point. The highest of these peaks is considered the melting point. The first polymer component has a melting point of less than about 105° C., preferably less than about 100° C., and most preferably less than about 90° C. and have a melting point preferably greater than about 25° C., preferably greater than about 40° C. The first polymer component also has a heat of fusion of less than about 45 J/g, preferably less than about 35 J/g, and more preferably less than about 25 J/g, as determined by differential scanning calorimetry.

According to another embodiment, the average molecular weight of the first polymer component can be between about 10,000 to about 5,000,000, and preferably between 80,000 to 500,000 with a polydispersity index (PDI) between about 1.5 to about 40, more preferably between about 1.8 to about 5, and most preferably between about 1.8 to 3. In one embodiment, the first polymer component has a Mooney viscosity (ML/1+4 at 125° C.) less than 100, more preferably less than 75, and most preferably less than 60. In one embodiment, the first polymer component has a narrow molecular weight distribution (MWD) between about 1.8 to about 5, and preferably between about 2 and about 3.2.

The polymerization catalyst used for the formation of first polymer component will introduce stereo- and regio-errors in the incorporation of polymer segments having the same stereorigidity. For example, in one embodiment, the first polymer component comprising a propylene and ethylene copolymer made with a polymerization catalyst, which forms essentially, or substantially isotactic polypropylene. Stereo errors are those where the propylene inserts in the chain with a tacticity that is not isotactic. A regio error in one where the propylene inserts with the methylene group or the methyldiene group adjacent to a similar group in the propylene inserted immediately prior to it. Such errors are more prevalent after the introduction of an ethylene in the first polymer component. Thus the fraction of propylene in isotactic stereoregular sequences (e.g. triads or pentads) is less than 1 for the first polymer component and decreases with increasing ethylene content of the first polymer component. Notwithstanding the presence of these errors the first polymer component is statistically random in the distribution of ethylene.

Second Polymer Component (SPC)

The "second polymer component" of the polymer blend compositions are defined as polymeric components, including blends, that include homopolymers or copolymers of ethylene or an alpha-olefin with at least 3 carbons in length or mixtures thereof, having segments with substantially the same tacticity, either isotactic or syndiotactic. These mixtures, regardless of their precise structure (whether a blend, a block copolymer, etc) are commonly know as impact copolymers or reactor copolymers.

The preferred embodiment of the second polymer component is homopolymers or copolymers of polypropylene with isotactic propylene sequences or mixtures thereof. The polypropylene used can vary widely in form. The propylene polymer component may be a combination of homopolypropylene, and/or random, and/or block copolymers as described herein. When the above propylene polymer component is a random copolymer, the percentage of the copolymerized alpha-olefin in the copolymer is, in general, up to about 9% by weight, preferably about 2% to about 8% by weight, most preferably, about 2% to about 6% by weight. The preferred alpha-olefins may contain 2 or from 4 to 12 carbon atoms. The most preferred alpha-olefin is ethylene.

The first polymer component of the present invention is predominately crystalline, i.e., it has a melting point generally greater than about 110° C., preferably greater than about 115° C., and most preferably greater than 130° C. The second polymer component generally has a heat of fusion greater than about 60 J/g, more preferably at least about 80 J/g.

In one embodiment, the weight average molecular weight of the second polymer component may be between about 10,000 to about 5,000,000, preferably about 50,000 to about 500,000 with a polydispersity index (PDI) between about 1.5 to about 40.

Third Polymer Component (TPC)

The third polymer component of the polymer blend compositions are defined as including a copolymer having segments with substantially the same tacticity. The tacticity may either be isotactic or syndiotactic. In an embodiment, the third polymer component comprises a copolymer of propylene and either ethylene and an alpha-olefin having 20 carbon atoms or less.

In one embodiment, the third polymer component of the polymer blend comprises a crystallizable copolymer of propylene. Preferably, the third polymer component has a crystallinity intermediate between the first polymer component and the second polymer component. In one specific embodiment, the third polymer component has a melting point from about 100° C. to about 130° C. In another specific embodiment, the third polymer component has a heat of fusion of from about 25 J/g to about 80 J/g.

In another embodiment, the third polymer component further comprises a non-conjugated diene monomer to aid in the vulcanization and other chemical modification of the polymer blend composition. The amount of diene is preferably less than 10 weight %, more preferably less than 5 weight %. The diene may be any non-conjugated diene which are commonly used for the vulcanization of ethylene propylene rubbers, and preferably is ethylidene norbornene, vinyl norbornene, or dicyclopentadiene.

Process Oil

Process oil may be added to the polymer blend compositions. Process oil should be added in an amount sufficient to lower the viscosity and flexibility of the blend while improving the properties of the blend at temperatures near and below 0° C. It is contemplated that the process oil lowers the glass transition temperature (Tg) of the blend. Additional benefits of adding process oil to the blend include improved processability and a better balance of elastic and tensile strength.

Examples of process oil include materials referred to as "extender oils" in the rubber application field. The process oil may include hydrocarbons consisting essentially of carbon and hydrogen with traces of hetero atoms such as oxygen or consisting essentially of carbon, hydrogen and at least one hetero atom such as dioctyl phthalate, ethers and polyethers. Certain process oils have a boiling point such that they are substantially involatile at 200° C.

The use of process oils to lower the glass transition temperature of blends of isotactic polypropylene and ethylene propylene diene rubber is discussed in U.S. Pat. Nos. 5,290,886 and 5,397,832, and the information in the detailed description and in the examples of those patents relating to the use of process oils is hereby incorporated by reference. Those procedures may be applied to the polymer blend compositions. The polymer blend compositions may include process oil in the range of from 1 to 50, preferably in the range of from 2 to 20 parts by weight of process oil per hundred parts of total polymer in the polymer blend compositions.

Polymerization Processes

A variety of polymerization processes may be used to form the polymers and polymer blends described herein, which include the copolymers in the first, second, and third polymer components, and the semicrystalline random copolymers in the composite structures. Preferably, the polymerization process utilizes a chiral catalyst, which may be a traditional Ziegler-Natta catalyst or a metallocene catalyst system. The chiral catalyst provides a polymer having sequences with a certain tacticity. According to a preferred embodiment, the chiral metallocene catalyst is a biscyclopentadienyl metal compound, as described in U.S. Pat. No. 5,198,401 and the information in the detailed description and examples of the patent are hereby incorporated by reference. The catalyst systems may also include well known additives such as scavengers. See, for example, the disclosure of additives in U.S. Pat. No. 5,153,157 which is incorporated herein by reference.

The polymers of the present invention may be produced in any suitable polymerization process. Polymerization methods include high pressure fluid, slurry, gas, bulk, or solution phase polymerization or combinations thereof. When utilized in a gas phase, slurry phase, or suspension phase polymerization, the catalyst systems will preferably be supported catalyst systems. See, for example, the disclosure of catalyst systems in U.S. Pat. No. 5,057,475 which is incorporated herein by reference.

These processes may be employed without limitation of the type of reaction vessels and the mode of conducting the polymerization. For example, the polymer may be produced in a single stage or multi stage reactor connected in series or parallel. However, as discussed above, the semicrystalline random copolymer may be prepared in a single stage reactor. The reactors may be operated adiabatically or non-adiabatically. Polymerization may be carried out by a continuous or batch process and may include use of chain transfer agents, scavengers, or other such additives as deemed applicable. Furthermore, the polymer recovery may be any known solvent removal apparatus or combination thereof known to one skilled in the art. Examples of such solvent removal apparatuses are flash vessels, two-phase liquid separators, devolatilizing extruders, thermal dryers and mixers, etc. Furthermore, the solvent removal process may be an aqueous or an substantially anhydrous removal process wherein minor amounts of water are present to deactivate the catalyst system.

A specific embodiment of a polymerization process comprises a solution polymerization process utilizing a suitable diluent. The monomers are contacted to the catalyst system comprising a biscyclopentadienyl metal compound and either 1) a non-coordinating compatible anion activator, or 2) an alumoxane activator. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ration of biscyclopentadienyl metal compound to non-coordinating anion of 10:1 to about 1:1. The above polymerization reaction is conducted by reacting such monomers in the presence of such catalyst system at a temperature of from about −100° C. to about 300° C. for a time from about 1 second to about 10 hours to produced a copolymer having a weight average molecular from about 10,000 to about 5,000,000 and a molecular weight distribution from about 1.8 to about 5.

EXAMPLES

Example 1

This example discusses preparation of polymer film structure made using polymers that include crosslinked EPDM. The ingredients and properties of Samples 1–3 in this example are reflected in Table 1. The polymer used to make Sample 1 is identified as EPDM A, which contains 69 wt % ethylene, 28.1 wt % propylene, and 2.9 wt % ethylidene norbornene.

Sample 2 is made from a blend of 90 parts EPDM A and 10 parts of a propylene-ethylene copolymer. The polymer of Sample 3 is a different EPDM polymer (EPDM B) also containing 69 wt % ethylene, 28.1 wt % propylene, and 2.9 wt % ethylidene norbornene but having a different Mooney viscosity than EPDM A. Each of the samples was prepared in a 1600 cc Banbury mixer using an upside down mix protocol. Additives were placed first into the mixer, and the polymer was added last. The polymer and additives were mixed for under 2 minutes reaching temperatures between 138° C. and 149° C. in the mixer. The composition was then discharged from the mixer. The sulfur cure package was added to the composition, and the composition was well homogenized by using a two roll mill. The compounds were press cured for 40 minutes at 160° C. Standard ASTM specimens were died out from the cured slabs and tested using appropriate ASTM methods.

TABLE 1

| Thermoset Compound | Units | Sample 1 | Sample 2 | Sample 3 |
|---|---|---|---|---|
| EPDM A | | 100 | 90 | — |
| EPDM B | | — | — | 100 |
| FPP (Melt Index = 25) | | — | 10 | — |
| N650 High Structure GPF Black | | 89 | 89 | 81 |
| Semi Reinforcing Black | | — | — | 20 |
| Austin Black | | 17 | 17 | 18 |
| Hiwhite R Clay | | 65 | 65 | 45 |
| Process Oil- Sunpar 2280 | | 60 | 60 | 78 |

TABLE 1-continued

| Thermoset Compound | Units | Sample 1 | Sample 2 | Sample 3 |
|---|---|---|---|---|
| Zinc Oxide | | 3.0 | 3.0 | 2.5 |
| Stearic Acid | | 2.0 | 2.0 | 1.5 |
| Rubber Cure Ingredients | | 3.97 | 3.97 | 8.2 |
| Specific Gravity | | 1.25 | 1.25 | 1.20 |
| CMPD. MOONEY VISCOSITY (ML) | | | | |
| (1 + 4) 125° C. | MU | 67 | 67 | 50 |
| (1 + 4) 100° C. | MU | 59 | 59 | 36 |
| MOONEY SCORCH at 135° C. (275° F.)- Large Rotor | | | | |
| Initial Viscosity | MU | 54 | 50 | 45 |
| Min Viscosity | MU | 39 | 39 | 36 |
| t5 | Min | 26 | 25 | 22 |
| ODR @ 160° C. (320° F.) 3° arc, 30 min motor | | | | |
| ML | DNm | 7 | 6 | 6.4 |
| MH | DNm | 60 | 46 | 55.4 |
| ts2 | Min | 6.9 | 7.4 | 6.3 |
| t50 | Min | 12.6 | 12.8 | 11.4 |
| t90 | Min | 23.4 | 23.4 | 21.4 |
| Rate | DNm/min | 6.5 | 4.8 | 6.8 |
| MH-ML | DNM | — | — | 49 |
| Press Cure, 40 min at 160° C. (320° F.) | | | | |
| Hardness | Shore A | 72 | 72 | 70 |
| 100% Modulus | MPa | 3.0 | 3.0 | 2.8 |
| 200% Modulus | MPa | 4.9 | 4.9 | 4.8 |
| 300% Modulus | MPa | 6.6 | 6.4 | 6.5 |
| Tensile Strength | MPa | 9.4 | 8.9 | 10.6 |
| Elongation | % | 506 | 507 | 553 |
| Tear-Die C (Peak Value) | KN/m | 38 | 33 | 41 |
| Trouser Tear (Peak Value) | KN/m | 22 | 18 | 25 |

Example 2

This example discusses preparation of films made from adhesive polymer blend compositions, e.g., which may be used to form an adhesive interface. Samples 4–9 were made of a semicrystalline random copolymer (identified as "FPP") having a melt index of 25 blended with a polypropylene homopolymer (identified as "SPP") having a melt flow rate of 2. The amount of FPP was varied in each of Samples 4–9 from 30 to 70 wt %, and the amount of SPP was varied from 15 to 45 wt %, with different amounts of calcium carbonate and oil, as reflected in Table 2, which also shows certain properties of Samples 4–9. The formulations were mixed in a 300 cc Braebender mixer at a temperature of 200° C. The FPP and SPP components were first added to the preheated chamber of the mixer and allowed to flux with the mixer running at low rpm. The mixing intensity was increased, and the other ingredients, such as filler and process oil, were then added to the mixer. Mixing was continued for 2 minutes to form a homogenous compound. The blend compositions were discharged from the mixer and compression molded in Carver press at 200° C. for 8 minutes to form a 20 mils thick pad. ASTM specimens were died out from the compression molded pad, and these were tested.

TABLE 2

| Formulation of Samples | Units | 4 | 5 | 6 | 7 | 8 | 9 |
|---|---|---|---|---|---|---|---|
| FPP (Melt Index = 25) | | 60 | 50 | 30 | 50 | 40 | 60 |
| SPP (Escorene ® 4292) | | 22 | 30 | 45 | 15 | 25 | 15 |
| Calcium Carbonate | | 11 | 5 | 10 | 20 | 20 | 20 |
| Oil (Sunpar 2280) | | 8 | 15 | 15 | 15 | 15 | 5 |
| Antioxidant (Irganox 1010) | | 0.2 | 0.2 | 0.2 | 0.2 | 0.5 | 0.5 |
| Physical Properties @ 21° C., from sheets pressed for 8 min. @ 200° C./ cooled for 5 min. | | | | | | | |
| Hardness | Shore A | 79 | 84 | 91 | 72 | 82 | 75 |
| 25% Modulus | MPa | 2.2 | 2.5 | 7.1 | 1.4 | 2.7 | 1.9 |
| 100% Modulus | MPa | 2.9 | 3.4 | 9.1 | 2.1 | 3.6 | 1.9 |
| 200% Modulus | MPa | 3.7 | 4.4 | 9.9 | 2.6 | 4.4 | 2.3 |
| 300% Modulus | MPa | 4.6 | 5.6 | 10.4 | 3.1 | 5.3 | 2.8 |
| Tensile @ Brk | MPa | 14.2 | 10.9 | 14.7 | 9.7 | 11.2 | 12.0 |
| Elongation | % | 893 | 795 | 738 | 993 | 811 | 885 |
| Physical Properties @ 50° C. | | | | | | | |
| 20% Modulus | MPa | 0.9 | 1.0 | 4.3 | 0.5 | 0.1 | 0.6 |
| 100% Modulus | MPa | 0.8 | 1.3 | 5.5 | 0.6 | 1.7 | 0.8 |
| 300% Modulus | MPa | 1.5 | 1.6 | 6.2 | 0.8 | 2.1 | 1.0 |
| Tensile @ Brk | MPa | 1.9 | 1.6 | 7.5 | 1.1 | 2.3 | 1.8 |
| Elongation | % | 677 | 410 | 669 | 933 | 513 | 980 |
| Tear Strength @ 21° C. | | | | | | | |
| Tear, Die C (Peak Value) | KN/m | 48 | 57 | 82 | 34 | 49 | 38 |
| Trouser Tear (Peak Value) | KN/m | 35 | 35 | 54 | 27 | 32 | 32 |
| Heat Aging 28 days @ 70° C. | | | | | | | |
| Tensile Strength | MPa | 10.9 | 8.7 | 14.4 | 8.9 | 10.7 | 13.3 |
| Elongation | % | 704 | 654 | 688 | 887 | 732 | 816 |

Example 3

This example discusses certain adhesion properties of multi-layer composite structures made using selected combinations of Samples 1–3 with Samples 4–9. The adhesion properties of the compositions were measured using a strip peel test. Two 100 mm×25 mm strips of crosslinked EPDM compositions from one of Samples 1–3 were placed over each other, and a tie layer strip made from one of Samples 4–9 was placed between those two strips. A piece of Mylar was also placed between each EPDM strip and tie layer to form a tab. That tab was used for gripping the specimen in an Instron test fixture. The three layers were seamed together with a hot air gun (having a minimum temperature rating of 750° F.) for 2 minutes. Upon completion of heating, a 2.5 Kg roller was applied over the sample 5 times to provide uniform pressure to the seams. The samples were allowed to cool for 24 hours prior to testing. To simulate a 180° peel test, one end of the specimen containing the Mylar film was gripped and pulled by an Instron test fixture. The testing speed was 50 mm/min. The peak force (KN/m) was recorded during the test and used as a measure of adhesion strength.

Table 3 reflects the adhesion results at room temperature. The control experiments were performed with no tie layer ("None" column). Those structures had no peel strength, demonstrating that the EPDM compositions have no adhesion with one another. In contrast, the composite structures that included the tie layer of one of Samples 4–9 showed excellent peel strength. It was observed that tear occurred inside the EPDM structure rather than inside the tie layer. The seam strength was greater than the inherent tear properties of the EPDM polymer structure, forcing tear within the EPDM structure. The type of failure was cohesive in all the compositions. Even though the properties of the tie layer varied substantially because of composition differences, the peel strength of the seams were uniformly high in all cases and was found to be independent of the tie layer compound properties.

TABLE 3

| | Peel Force (KN/m) | | | | | |
|---|---|---|---|---|---|---|
| | None | 4 | 5 | 6 | 7 | 8 | 9 |
| Sample 1 | 0 | 35.4 | 24.7 | 16.7 | 27.4 | 16.1 | 21.9 |
| Sample 2 | 0 | 19.6 | 19.3 | 13.8 | 23.6 | 16.2 | 19.8 |
| Sample 3 | 0 | 23.5 | 18.7 | 18.7 | 25.2 | 22.4 | 20.6 |

Example 4

This example discusses preparation of certain polymer structures (single film layers) each made from a crosslinked EPDM, identified below, blended with different samples and amounts of a Semi Crystalline Propylene Polymer (SCPP). The composition and tensile properties of each polymer structure are reflected in Table 4, where the first column identifies each of polymer structure samples 1–21.

Each of the SCPP compositions 1–5 was a random copolymer of propylene and ethylene synthesized using M1 having different Mooney viscosities and different ethylene contents, ranging from 12.2 wt % to 17.2 wt %, as reflected in Table 4. Each of the structures contained the EPDM in amounts of 6, 12, 18 and 24 wt % (with the exception of Sample 1, which contained no EPDM).

The EPDM/SCPP blends identified in Table 4 were formulated as follows. A blend of 57.8 g of Vistalon 4600 (an EPDM terpolymer available from ExxonMobil Chemical Company, Houston, Tex.), 54.9 g of N650 carbon black, 43.4 g calcium carbonate, 40.5 g of Sunpar 2280, a process oil, 2.9 g of zinc oxide and 0.6 g of stearic acid were mixed for 7 minutes in a Braebender intensive mixer at a temperature not to exceed 130° C. When the EPDM mixture was homogenous, it was removed and allowed to cool to room temperature. Different sample sheets made from blends of those EPDM blends and SCPP, as reflected in Table 4, were then prepared. Specifically, each of the EPDM blends was mixed on a roll mill for about 3 to 5 minutes with different amounts of the SCPP samples (as described in Table 4), along with 0.4 g sulfur, 0.3 g TMTDS and 0.9 g ZDBDC Table 4 shows the amount of SCPP used in each blend formulation, as well as the composition and viscosity of each SCPP. Each of the final blend formulations was then milled into a flat sheet on a roll mill and vulcanized into 8"×8" specimens between aluminum plates in the platens of an electrically heated press maintained at 170° C. for 30 minutes, resulting in crosslinking of the blend formulations. Tensile data, also reflected in Table 4 were obtained from specimens of the crosslinked sheets. Adhesion T-peel experiments (discussed below in Examples 5 and 6) were conducted using samples having a cloth backing on one side only.

TABLE 4

| | SCPP 1 | SCPP 2 | SCPP 3 | SCPP 4 | SCPP 5 | Elongation (%) | Tensile Strength (psi) |
|---|---|---|---|---|---|---|---|
| C2 wt % | 15.7 | 17.2 | 11.3 | 15.3 | 12.2 | — | — |
| ML @ 125° C. | 13 | 23 | 29 | 9 | 9 | — | — |
| 1 | 0 | | | | | 547 | 1624 |
| 2 | 6 | | | | | 570 | 1571 |
| 3 | 12 | | | | | 583 | 1554 |
| 4 | 18 | | | | | 590 | 1520 |
| 5 | 24 | | | | | 609 | 1566 |
| 6 | | 6 | | | | 550 | 1515 |
| 7 | | 12 | | | | 530 | 1355 |
| 8 | | 18 | | | | 535 | 1231 |
| 9 | | 24 | | | | 524 | 1144 |
| 10 | | | 6 | | | 549 | 1608 |
| 11 | | | 12 | | | 548 | 1710 |
| 12 | | | 18 | | | 564 | 1806 |
| 13 | | | 24 | | | 602 | 1938 |
| 14 | | | | 6 | | 558 | 1531 |
| 15 | | | | 12 | | 571 | 1573 |
| 16 | | | | 18 | | 586 | 1587 |
| 17 | | | | 24 | | 610 | 1650 |
| 18 | | | | | 6 | 450 | 1253 |
| 19 | | | | | 12 | 587 | 1754 |
| 20 | | | | | 18 | 534 | 1592 |
| 21 | | | | | 24 | 598 | 1765 |

Example 5

This example discusses preparation of composite structures (film laminates) in which crosslinked EPDM/SCPP blend polymer structures were laminated to different Crystalline Polypropylene (CPP) film structures, by "sandwiching" the CPP between the two crosslinked samples, to form a composite structure. To prepare each of the sample structures 1–21 in Table 5, two identical polymer film structures, each 1" wide and 6" long, from Example 4 (Samples 1–21 from Example 4), were laminated to an identically shaped sample of CPP. Five different CPPs, obtained from ExxonMobil Chemical Company, Houston, Tex., were used to make the CPP film structures, characterized as follows: CPP-1 was a Type ES4292 isotatic polypropylene (iPP), having no ethylene content and an MFR @ 230° C. of 1.4 g/min. CPP-2 was a Type ES4403 iPP, with no ethylene and an MFR of 7.4. CPP-3 was a Type ES3854 iPP, with no ethylene and an MFR of 27. CPP-4 was a Type ES7623 ICP having an ethylene content of 9 wt % and an MFR of 8.9. CPP-5 was a Type ES9263 RCP having an ethylene content of 2.5 wt % and an MFR of 2.9.

A sandwich was constructed, of the two crosslinked samples with the cloth backing facing out, and a sample of the CPP interleaved between them. Two pieces of a Mylar film (10 mils thick, about 2" wide) were introduced at one end of the sandwich, one at each interface between the crosslinked EPDM/SCPP elastomer film sample and the CPP film sample. The Mylar film covered only 1" from the edge of the sandwich. These non-adhered portions of the cloth-backed structure were later used as tabs for the subsequent tensile experiment. Each sandwich, containing the three polymer layers and the two Mylar films partly inserted into the interfaces, was heated in an electrically heated press at 145° C. for 15 minutes at contact pressure (without any superficial pressure). At the end of that period, the sample was removed and while still at a high temperature, was rapidly rolled six times with a 2.2 kg rubberized roller. This sample was allowed to rest for 5 days, then tested for adhesion on an Instron tensile tester. The non-adhered portions formed by use of the Mylar film at one end of the sandwich were used as tabs for the grips in the equipment, and an initial separation of 2" was used. The force needed for separation of the grips at a rate of 2"/min was measured, and the average value during the forced separation of the interface of the CPP film and EPDM/SCPP film is reported in Table 5 below (lbs./in).

TABLE 5

| Sample | CPP-1 | CPP-2 | CPP-3 | CPP-4 | CPP-5 |
|---|---|---|---|---|---|
| 1 | 2.2 | 3.5 | 5.5 | 5.9 | 4.9 |
| 2 | 5.3 | 5.0 | 4.3 | 3.8 | 9.5 |
| 3 | 7.8 | 8.9 | 6.7 | 12.6 | 13.6 |
| 4 | 12.9 | 16.8 | 18.9 | 15.6 | 18.2 |
| 5 | 19.5 | 26.7 | 35.5 | 28.5 | 34.6 |
| 6 | 3.2 | 5.3 | 3.7 | 4.6 | 7.6 |
| 7 | 3.8 | 6.5 | 7.8 | 12.5 | 13.6 |
| 8 | 7.2 | 17.8 | 19.7 | 19.8 | 23.9 |
| 9 | 16.3 | 25.0 | 30.2 | 29.8 | 42.7 |
| 10 | 4.3 | 5.6 | 7.8 | 9.8 | 8.9 |
| 11 | 10.0 | 7.8 | 16.8 | 14.7 | 12.3 |
| 12 | 12.3 | 19.0 | 31.0 | 21.9 | 27.8 |
| 13 | 20.3 | 27.0 | 39.0 | 35.6 | 39.8 |
| 14 | 4.6 | 5.6 | 4.6 | 6.9 | 6.3 |
| 15 | 7.2 | 9.5 | 12.3 | 12.7 | 18.5 |
| 16 | 11.9 | 18.9 | 19.0 | 18.5 | 26.7 |
| 17 | 15.1 | 23.9 | 31.9 | 28.9 | 43.8 |
| 18 | 5.6 | 4.5 | 5.6 | 7.7 | 8.3 |
| 19 | 12.7 | 12.4 | 18.9 | 16.7 | 18.7 |
| 20 | 16.3 | 15.3 | 34.6 | 20.0 | 25.8 |
| 21 | 21.1 | 28.9 | 42.2 | 34.4 | 43.6 |

Example 6

This example discusses preparation of composite structures (film laminates) in which crosslinked EPDM/SCPP blend polymer structures were laminated to different Semi-Crystalline Propylene Polymer (SCPP) film samples, by "sandwiching" different SCPP films between two identical crosslinked EPDM/SCPP blend polymer structures (films) to form composite structures. Different adhesion temperatures were used to form different composite structures, and each of the composite structures was tested for adhesion strength.

To prepare each of the composite structures reflected in Table 7, two identical EPDM/SCPP polymer film structures from Example 4 were laminated to an identically shaped SCPP sample as identified in Table 7, being 1" wide and 6" long. A sandwich of the two crosslinked films with the cloth backing facing out was constructed, with an SCPP sample interleaved between them. Two pieces of Mylar film (10 mils thick, about 2" wide) were introduced at one end of each sandwich, one at each interface. The Mylar film, which covered only 1" from the edge of the sandwich, prevented adhesion between the SCPP film and the crosslinked film. Those non-adhered portions of the cloth-backed film structure were then used as tabs for the subsequent tensile experiment. Each sandwich, containing the three polymer layers and the two Mylar films partly inserted into the interfaces, was heated in an electrically heated press at different temperatures indicated below for 15 minutes at contact pressure (without any superficial pressure). These temperatures were thus considered to be adhesion temperatures for the composite structure (sandwich). At the end of each heating/contacting period, the composite structure sample was removed and, while still at an elevated temperature, was rapidly rolled six times with a 2.2 kg rubberized roller. Each composite structure sample was then allowed to rest for 5 days, then tested for adhesion strength on an Instron tensile tester. The non-adhered portions formed by use of the Mylar film at one end of the sandwich were used as tabs for the grips in the equipment, and an initial grip separation of 2" was used. For each sample, the force needed for separation of the grips at a rate of 2"/min was measured. The average measured values during the forced separation of the SCPP film structure from the crosslinked EPDM/SCPP film structure are reported in Table 7 below.

TABLE 7

| SCPP | 150° C. | 125° C. | 100° C. | 75° C. | 50° C. |
|---|---|---|---|---|---|
| 1 | 32.3 | 34.6 | 21.9 | 8.9 | 5.9 |
| 2 | 21.4 | 19.2 | 17.8 | 13.8 | 12.5 |
| 3 | 42.8 | 38.8 | 22.7 | 4.8 | 1.2 |
| 4 | 35.8 | 33.7 | 21.7 | 7.8 | 5.6 |
| 5 | 44.5 | 39.0 | 25.8 | 5.3 | 2.3 |

Example 7

This example discusses preparation of composite structures (film laminates) in which selected Crystalline Polypropylene (CPP) and Crystalline Polyethylene (CPE) film samples were laminated to Semi Crystalline Polypropylene Polymer (SCPP) film samples, by "sandwiching" the CPP or CPE film between two SCPP films to form composite film structures. The adhesion strength for each composite structure is reported in Table 8.

The SCPP-1 sample had an ethylene content of 12 wt % and a Mooney viscosity of 12 ML @ 125° C. The SCPP-2 sample had an ethylene content of 15 wt % and a Mooney viscosity of 22 ML @ 125° C. Each of the SCPP samples was 6" wide and 6" long, with a cloth backing on one side. The CPP and CPE film samples were obtained from ExxonMobil Chemical Company, Houston, Tex. Sample CPP-1 was a type PP 4292 isotatic polypropylene polymer (iPP), with no ethylene content and having an MFR @ 230° C. of 1.4 g/min. Sample CPP-2 was a type PD 4443 iPP, with no ethylene content and having an MFR of 7.4. Sample CPP-3 was a type PP 9513 RCP having an ethylene content of 2.8 wt % and an MFR of 7.2. Sample CPE-1 was a type HD 6706 polyethylene polymer, having an ethylene content of 99.9 wt % and a melt index of 6.7.

In forming each of the composite film structures samples shown in Table 8, two identical SCPP samples were laminated to an identically shaped CPP or CPE sample. For each composite film structure, a sandwich was constructed, in which a sample of the CPP or CPE was interleaved between two identical SCPP samples, having the cloth backing facing out. Two pieces of a Mylar film (10 mils thick, about 2" wide) were introduced at one end of the sandwich, between the SCPP and the CPP or CPE. The Mylar film, which covered only 1" from the edge of the sandwich, prevented adhesion between the SCPP and CPP or CPE, and provided a non-adhered portion, which was later used for the tensile testing, discussed below. Specifically, each sandwich, containing the three polymer layers and two Mylar films partly inserted into the interfaces, was heated in an electrically heated press at different adhesion temperatures, as reported in Table 8, for 15 minutes at contact pressure (without any superficial pressure). At the end of this period, the sample was removed and while still at the elevated temperature, was rapidly rolled six times with a 2.2 kg rubberized roller. Each sample was then allowed to rest for 7 days, then tested for adhesion strength on an Instron tensile tester. The non-adhered portions formed by use of Mylar film at one end of the sandwich were used as tabs for the grips in the equipment, and an initial grip separation of 1" was used. The force needed for separation of the grips at a rate of 2"/min was measured, and the maximum value during the forced separation of the interface of the SCPP and CPP or CPE layers was measured and reported in Table 8.

samples had a cloth backing on one side, and were 6" wide and 6" long. The Mylar film, which covered only 1" from the edge of the sandwich, prevented adhesion between the SCPP and CPP, and provided a non-adhered portion, which was later used for the adhesion testing, discussed below. Specifically, each sandwich, containing the three polymer layers and two Mylar films partly inserted into the interfaces, was heated in an electrically heated press at an adhesion temperature of 120° C. for 15 minutes at contact pressure (without any superficial pressure). At the end of this period, the sample was removed and while still at the elevated temperature, was rapidly rolled six times with a 2.2 kg rubberized roller. Each sample was then allowed to rest for 7 days, then tested for adhesion strength on an Instron tensile tester. The non-adhered portions formed by use of Mylar film at one end of the sandwich were used as tabs for the grips in the equipment, and an initial grip separation of 1" was used. The force needed for separation of the grips at a rate of 2"/min was measured, and the maximum value during the forced separation of the interface of the SCPP and CPP layers was measured. The different compositions and physical properties of the six different SCPP films are reported in Table 9, which also shows the adhesion strength (lbs./in).

TABLE 9

| SCPP | C2 wt % | MFR @ 230 C | Adhesion Strength |
|------|---------|-------------|-------------------|
| 1a | 12 | 31 | 11 |
| 2a | 12 | 45 | 22 |
| 3a | 12 | 58 | 16 |
| 4a | 15 | 25 | 35 |
| 5a | 15 | 37 | 34 |
| 6a | 15 | 46 | 30 |

Example 9

This example discusses preparation of composite structures (film laminates) in which three different samples of a

TABLE 8

| | 160° C. | 150° C. | 140° C. | 130° C. | 120° C. | 110° C. | 100° C. | 90° C. | 80° C. | 70° C. |
|---|---|---|---|---|---|---|---|---|---|---|
| SCPP-1 | | | | | | | | | | |
| CPP-1 | 53 | 62 | 61 | 45 | 22 | 16 | 13 | 4 | 1 | 0 |
| CPP-2 | 59 | 59 | 52 | 47 | 34 | 19 | 21 | 3 | 0.9 | 0.1 |
| CPP-3 | >56 | >59 | 64 | >56 | 50 | 61 | 51 | 8 | 5 | 0.3 |
| CPE-1 | 7 | 10 | 3 | 0.8 | 0.4 | — | — | — | — | — |
| SCPP-2 | | | | | | | | | | |
| CPP-1 | 57 | 58 | 50 | 51 | 43 | 49 | 43 | 30 | 24 | 14 |
| CPP-2 | 67 | 58 | 51 | 50 | — | — | — | — | — | — |
| CPP-3 | >70 | >59 | >62 | 61 | >53 | >60 | 62 | 55 | 43 | 36 |
| CPE-1 | 17 | 10 | 16 | 4 | — | — | — | — | — | — |

Example 8

This example discusses preparation of composite structures (film laminates) in which identical samples of a selected Crystalline Polypropylene Polymer (CPP) film were laminated to different Semi Crystalline Polypropylene Polymer (SCPP) film samples, by "sandwiching" or interleaving the CPP film between the two SCPP films, which were laminated to form a composite film structure. The CPP samples were CPP-1, described in Example 7, namely, a type PP 4292 isotatic polypropylene polymer (iPP), with no ethylene content and having an MFR @ 230° C. of 1.4 g/min. For each composite film structure, a sandwich was constructed, in which the CPP-1 film sample was interleaved between and laminated to two identical SCPP film samples at an adhesion temperature of 120° C. The SCPP film selected Crystalline Polypropylene Polymer (CPP) film, i.e., CPP-1, CPP-2 and CPP-3 from Example 7, were laminated to identical samples of Semi Crystalline Polypropylene Polymer (SCPP) film, i.e., SCPP-1 sample for Example 7, by "sandwiching" or interleaving the CPP film between two SCPP-1 films, which were laminated to form a composite film structure.

For each composite film structure, a sandwich was constructed, in which the CPP film sample was interleaved between and laminated to two identical SCPP-1 film samples at an adhesion temperature of 120° C. The SCPP film samples had a cloth backing on the outside (away from the CPP film), and were 6" wide and 6" long. The Mylar film, which covered only 1" from the edge of the sandwich, prevented adhesion between the SCPP and CPP, and provided a non-adhered portion, which was later used for the adhesion testing, discussed below. Specifically, each sandwich, containing the three polymer layers and two Mylar films partly inserted into the interfaces, was heated in an electrically heated press at an adhesion temperature of 120° C. for 60 minutes at contact pressure (without any superficial pressure). At the end of this period, the sample was removed and while still at the elevated temperature, was rapidly rolled six times with a 2.2 kg rubberized roller. Each sample was then allowed to rest for 7 days, then tested for adhesion strength on an Instron tensile tester. The non-adhered portions formed by use of Mylar film at one end of the sandwich were used as tabs for the grips in the equipment, and an initial grip separation of 1" was used. The force needed for separation of the grips at a rate of 2"/min was measured, and the maximum value during the forced separation of the interface of the SCPP and CPP layers was measured. The different compositions and adhesion strength (lbs./in) are reported in Table 10.

TABLE 10

| Film Structure | Adhesion Strength (lbs./in) |
| --- | --- |
| SCPP-1/CPP-1 | 67 |
| SCPP-1/CPP-2 | 63 |
| SCPP-1/CPP-3 | 69 |

Example 10

This example describes preparation of different semicrystalline random ethylene-propylene copolymers. The copolymers were prepared using an M1 metallocene catalyst activated with a DMA/D4 activator system. The ethylene contents, melting points, and heats of fusion of the copolymers are reported in Table 11. Any one of the copolymers in Table 11 may be used in the place of any of the SCPPs described in the Examples above. More generally, as discussed elsewhere herein, in accordance with aspects of the invention, any one of these copolymers can be incorporated into a composite polymer structure, to provide improved adhesion to the structure, either in a composite structure that includes two polymer structures, e.g., film layers, in which case the copolymer is blended with the polymer(s) used in forming one or both of the polymer structures, or in a composite structure that includes at least three polymer structures, in which case a film layer containing an effective amount of the copolymer represents one of the polymer structures, where the film layer is interposed between two other polymer structures that have the same or different compositions.

TABLE 11

| Copolymer Sample | C2 (wt %) | Tm (degrees C) | Heat of Fusion (J/g) |
| --- | --- | --- | --- |
| 1 | 5.5 | 96.7 | 53 |
| 2 | 5.7 | 91.1 | 48 |
| 3 | 7.9 | 76.8 | 35 |
| 4 | 11.9 | 46.3 | 19 |
| 5 | 12.4 | 46.9 | 17 |
| 6 | 13.0 | 47.2 | 16 |
| 7 | 14.2 | 48.3 | 8 |
| 8 | 16.3 | 52.0 | 2 |

All documents cited herein are fully incorporated by reference for all jurisdictions in which such incorporation is permitted and to the extent they are not inconsistent with this specification. All documents to which priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

What is claimed is:

1. A composite structure, comprising (a) a first polymer structure and (b) a second polymer structure, the first polymer structure being adhered to the second polymer structure by (c) an adhesive interface between the first polymer structure and the second polymer structure wherein interfacial adhesion is provided by a semicrystalline random copolymer in the first polymer structure, the second polymer structure, or in a third adhesive structure, the semicrystalline random copolymer comprising 70–88 mole % propylene units and alpha olefin units having 2 or from 4 to 10 carbon atoms, the semicrystalline random copolymer having a heat of fusion of from 2 to 90 J/g and a crystallinity of from 2% to 65% of the crystallinity of isotatic polypropylene.

2. A composite structure comprising: (a) a first solid polymer component; (b) a second solid polymer component which includes from 5 to 30 wt % of an isotactic polymer comprising a semi-crystalline random copolymer with 75 mole % to 95 mole % of propylene derived units in surface contact with the first component and having a melting point of from 25° C. to 105° C., the components being adhered together by melting to form the composite structure.

3. A composite structure comprising: (a) a first solid polymer component; (b) a second solid polymer component which includes from 5 to 30 wt % of an isotactic polymer comprising a semi-crystalline random copolymer with 75 mole % to 95 mole % of propylene derived units in surface contact with the first component and having a melting point of from 25° C. to 105° C., the components being adhered together by pressure at an elevated temperature sufficient to provide bonding between the first and second solid polymer components.

4. A composite structure comprising (a) a first polymer structure having a continuous phase that includes a crosslinked thermoplastic material or a thermoplastic polymer and (b) a second polymer structure having a continuous phase that includes a crosslinked thermoplastic material or a thermoplastic polymer, the second polymer structure being adhered to the first polymer structure by an adhesive interface between the first polymer structure and the second polymer structure wherein interfacial adhesion is provided by (c) a polymer blend that includes: (i) from 5 wt % to 98 wt % of a semi-crystalline random copolymer comprising 70–88 mole % or more propylene units and alpha olefin units having 2 or from 4 to 10 carbon atoms, the semi-crystalline random copolymer having a heat of fusion of 2–90 J/g, a melting point of from 25° C. to 105° C. and a crystallinity of from 2% to 65% of the crystallinity of isotatic polypropylene, and (ii) from 2 wt % to 95 wt % of isotatic polypropylene having a melting point of 110° C. or greater.

5. The composite structure of claim 1 in which the melting point of the first polymer structure and the melting point of the second polymer structure are higher than the melting point of the semicrystalline random copolymer.

6. The composite structure of claim 1 in which the debonding temperature of the composite structure is higher than the bonding temperature of the composite structure.

7. The composite structure of claim 1 in which the semicrystalline random copolymer has a melting point of from 25° C. to 105° C.

8. The composite structure of claim 1 in which the semicrystalline random copolymer is obtainable by polymerizing monomers in the presence of a metallocene catalyst.

9. The composite structure of claim 1 in which the semicrystalline random copolymer has a crystallinity of from 2 to 45 J/g.

10. The composite structure of claim 1, in which the composite structure has a peel strength of at least 13.8 KN/m and an initial tensile strength at a temperature of 21° C. of at least 9.7 Mpa.

11. The composite structure of claim 1 in which the semi-crystalline random copolymer has an MM fraction triad tacticity of from 80% to 100%.

12. The composite structure of claim 1 in which the semi-crystalline random copolymer has an MM fraction triad tacticity of from 80% to 100% and the first or second polymer structures include a crystalline isotatic polymer also having an MM fraction triad tacticity of from 80% to 100%.

13. The composite structure of claim 1 in which the interfacial adhesion is provided by a multiphase blend composition having a continuous phase that includes a continuous phase polymer and a dispersed phase that includes a dispersed phase polymer, the dispersed phase polymer having a melting point higher than the melting point of the continuous phase polymer, and a heat of fusion higher than the heat of fusion of the continuous phase polymer.

14. The composite structure of claim 1, in which the first structure and the second structure each comprises a crosslinked elastomeric material.

15. The composite structure of claim 1, in which: (a) the first polymer structure has a continuous phase of a crosslinked elastomeric material; and (b) the second polymer structure has a continuous phase of a thermoplastic polymer.

16. The composite structure of claim 1 in which the first polymer structure has a continuous phase of a first thermoplastic polymer and the second polymer structure has a continuous phase of a second thermoplastic polymer.

17. The composite structure of claim 4 in which the first polymer structure includes a blend of the crosslinked elastomeric material and the semicrystalline random copolymer.

18. The composite structure of claim 4 in which the second polymer structure includes a blend of the thermoplastic polymer and the semicrystalline random copolymer.

19. The composite structure of claim 1 in which the first polymer structure includes a first film and the second polymer structure includes a second film.

20. The composite structures of claim 14 in which the cross-linked elastomeric material comprises EPDM.

21. The composite structure of claim 1 in which the interfacial adhesion is provided by a blend that comprises from 5 wt % to 98 wt % of the semicrystalline random copolymer and further comprises from 5 wt % to 98 wt % of isotatic polypropylene having a melting point greater than 110° C.

22. The composite structure of claim 13 wherein the continuous phase polymer has a melting point less than 105° C. and a heat of fusion less than 45 J/g and wherein the dispersed phase polymer has a melting point greater than 110° C. and a heat of fusion greater than 60 J/g.

23. The composite structure of claim 13 wherein the continuous phase polymer and the dispersed phase polymer are both isotatic or syndiotactic.

24. The composite structure of claim 1 wherein the semicrystalline random copolymer has a crystallinity of from 2 to 30 J/g.

25. The composite structure of claim 1 wherein the semicrystalline random copolymer has a crystallinity of from 2 to 15 J/g.

26. The composite structure of claim 1 wherein the semi-crystalline random copolymer has an MM fraction triad tacticity of from 90% to 99%.

27. The composite structure of claim 1 wherein the semi-crystalline random copolymer has an MM fraction triad tacticity of from 90% to 99% and the first or second polymer structures include a crystalline isotatic polymer also having an MM fraction triad tacticity of from 90% to 99%.

28. The composite structure of claim 1 having a die tear strength of at least 34 KN/m at a temperature of 21° C.

29. The composite structure of claim 1 having a trouser tear strength of at least 27 KN/m at a temperature of 21° C.

30. The composite structure of claim 1 having an initial hardness of at least 72 Shore A at a temperature of 21° C.

31. The composite structure of claim 1 having an initial elongation of at least 738% at a temperature of 21° C.

32. The composite structure of claim 1 in which the debonding temperature of the composite structure is higher than the melting point of the first thermoplastic polymer, or is higher than the melting point of the second thermoplastic polymer.

33. The composite structure of claim 1 in which the first polymer structure or the second polymer structure is substantially rigid.

34. The composite structure of claim 4 in which the first thermoplastic polymer or the second thermoplastic polymer includes an isotatic crystalline polymer.

35. The composite structure of claim 4 in which the first thermoplastic polymer or the second thermoplastic polymer includes isotatic polypropylene.

36. The composite structure of claim 1 in which the first polymer structure or the second polymer structure includes blends that include thermoplastic polymers.

37. The composite structure according to claim 2 in which the semicrystalline random copolymer comprises from 25 to 5 mole % of ethylene derived units.

38. The composite structure according to claim 2 in which the semicrystalline random copolymer comprises a random copolymer produced by copolymerizing propylene and at least one of ethylene or an alpha olefin having less than 6 carbon atoms using a chiral metallocene catalyst system, the copolymer having a crystallinity from 2% to 65% from isotactic polypropylene sequences, a propylene content of from 75 wt % to 90 wt % and a melting point of from 25° C. to 105° C.

39. The composite structure according to claim 2 in which the semicrystalline random copolymer has a crystallinity of from 2 to 90 J/g.

40. The composite structure according to claim 2 in which the semicrystalline random copolymer has an MM fraction triad tacticity of from 90% to 100% and the semicrystalline random copolymer in the polymeric adhesive component also has an MM fraction triad tacticity of from 90% to 100%.

41. The composite structure according to claim 2 in which the second polymer component comprises from 5 to 98 wt % of the total polymer content of another olefin derived polymer.

42. The composite structure according to claim 2 in which the second polymer component comprises a blend composition comprising from 2% to 95% by weight of isotactic polypropylene having a melting point greater than 110° C.

43. The composite structure according to claim 2 in which the second component includes a blend composition that includes a crosslinked elastomeric material and the semicrystalline random copolymer.

44. The composite structure according to claim 2 wherein the second component includes a multiphase blend composition having a continuous phase that includes the semicrystalline random copolymer and another continuous phase polymer and a dispersed phase that includes a dispersed phase polymer, the dispersed phase polymer having a melting point higher than the melting point of the continuous phase polymer, and a heat of fusion higher than the heat of fusion of the continuous phase polymer.

45. The composite structure according to claim 2 in which the second solid component comprises from 5 to 98 wt % of a crosslinked elastomeric material.

46. The composite structure according to claim 2 wherein: (a) the first component is a rubbery component comprising a crosslinked elastomeric material; and (b) the second solid component is a thermoplastic elastomer having a matrix formed by the semicrystalline random copolymer blended with a propylene based polymer having a melting point greater than 110° C.

47. The composite structure according to claim 2 wherein the first component and the second component are each a substantially rigid molded or extruded component comprising an isotactic crystalline polymer.

48. The composite structure according to claim 2 in which the second component comprises EPDM or a thermoplastic polyethylene rubber blend.

49. The composite structure according to claim 2 in which the components are in the form of sheets heat sealed together.

50. The composite structure according to claim 2 wherein the structure has a peel strength of at least 13.8 KN/m at room temperature, an initial tensile strength of at least 9.7 Mpa at a temperature of 21° C., an initial hardness of at least 72 Shore A at a temperature of 21° C., an initial elongation of at least 738% at a temperature of 21° C., a die tear strength of at least 34 KN/m at a temperature of 21° C. and a trouser tear strength of at least 27 KN/m at a temperature of 21° C.

51. A composite structure comprising a first polymer component and a second polymer component disposed in substantially coplanar contact with the first polymer component, wherein either the first polymer component or the second polymer component includes either a cured rubber composition or a propylene-based crystalline polymer, and wherein either or both of the first and second polymer components additionally include a blend composition comprising from 2% to 95% by weight of a first adhesive polymer comprising isotactic polypropylene and having a melting point greater than 110° C., and from 5 wt % to 98 wt % of a second adhesive component comprising a random copolymer produced by copolymerizing propylene with at least one of ethylene or an alpha olefin having less than 6 carbon atoms, using a chiral metallocene catalyst system, the copolymer having a crystallinity of from 2% to 65% from isotactic polypropylene sequences, a propylene content of from 75 wt % to 90 wt % and a melting point of from 25° C. to 105° C.

52. A process for producing a composite structure, according to claim 50 which comprises bringing the components into contact at a first bonding temperature between 110° C. and above 40° C. to form the composite structure, the amount of the semicrystalline random copolymer and melting point of the polymer used in admixture with the semicrystalline random copolymer being selected such that the debonding temperature is above the first temperature.

* * * * *